US012611710B2

(12) United States Patent
Vogtmeier et al.

(10) Patent No.: US 12,611,710 B2
(45) Date of Patent: Apr. 28, 2026

(54) THREE-DIMENSIONAL PRINTED STRUCTURE WITH DOUBLE WALL ELEMENTS

(71) Applicant: KONINKLIJKE PHILIPS N.V., Eindhoven (NL)

(72) Inventors: Gereon Vogtmeier, Aachen (DE); Johannes Wilhelmus Maria Jacobs, Boxtel (NL); Edward Theodorus Maria Berben, Herten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 182 days.

(21) Appl. No.: 18/567,040

(22) PCT Filed: May 31, 2022

(86) PCT No.: PCT/EP2022/064781
§ 371 (c)(1),
(2) Date: Dec. 5, 2023

(87) PCT Pub. No.: WO2022/258439
PCT Pub. Date: Dec. 15, 2022

(65) Prior Publication Data
US 2024/0261855 A1 Aug. 8, 2024

(30) Foreign Application Priority Data
Jun. 7, 2021 (EP) ..................................... 21177925

(51) Int. Cl.
*A61B 6/06* (2006.01)
*B22F 5/10* (2006.01)
(Continued)

(52) U.S. Cl.
CPC .................. *B22F 5/10* (2013.01); *B22F 7/08* (2013.01); *B33Y 10/00* (2014.12); *B33Y 30/00* (2014.12); *B33Y 70/10* (2020.01); *B33Y 80/00* (2014.12)

(58) Field of Classification Search
CPC .... B22F 5/10; B22F 7/08; B22F 1/103; B22F 10/43; B22F 10/47; B22F 10/18;
(Continued)

(56) References Cited

U.S. PATENT DOCUMENTS 11,110,650 B1 * 9/2021 Wynne .................. B29C 64/124
2012/0057677 A1 3/2012 Vogtmeier
(Continued)

FOREIGN PATENT DOCUMENTS

KR 101656286 B1 9/2016
TW 201801893 A 1/2018
(Continued)

OTHER PUBLICATIONS

PCT International Search Report, International application No. PCT/EP2022/064781, Sep. 8, 2022.
(Continued)

*Primary Examiner* — Kiho Kim
(74) *Attorney, Agent, or Firm* — Larry Liberchuk

(57) ABSTRACT

In order to improve three-dimensional (3D) printing a high-aspect-ratio three-dimensional metal structures, there is provided a printing method that builds a wall comprising a center part made out of a metal-containing material and left and right parts made out of a plastic material forming first and second supporting wall elements. The plastic support material may be used to enable the build-up of a high-aspect-ratio 3D structure. The proposed printing strategy may be applicable to a cost-effective 3D printing technology, such as fused deposition molding (FDM).

13 Claims, 6 Drawing Sheets

M2=X-ray powder filled plastic filament

M1=Support material: plastic filament

(51) Int. Cl.
| | |
|---|---|
| *B22F 7/08* | (2006.01) |
| *B33Y 10/00* | (2015.01) |
| *B33Y 30/00* | (2015.01) |
| *B33Y 70/10* | (2020.01) |
| *B33Y 80/00* | (2015.01) |

(58) Field of Classification Search
CPC ......... B33Y 10/00; B33Y 30/00; B33Y 70/10;
B33Y 80/00; Y02P 10/25; B29C 64/40;
G21K 1/025; G21K 1/067
See application file for complete search history.

(56) References Cited

U.S. PATENT DOCUMENTS

| | | |
|---|---|---|
| 2015/0115494 A1 | 4/2015 | Deych |
| 2019/0389090 A1 | 12/2019 | Roy-Mayhew |

FOREIGN PATENT DOCUMENTS

| | | |
|---|---|---|
| WO | WO2008007309 A1 | 1/2008 |
| WO | WO2017037043 A1 | 3/2017 |
| WO | WO20190172907 A1 | 9/2019 |

OTHER PUBLICATIONS

Chueh Y-H. et al., "Additive Manufacturing of Hybrid Metal/Polymer Objects Via Multiple-Material Laser Powder Bed Fusion", Additive Manufacturing, vol. 36, Jul. 17, 2020 (Jul. 17, 2020), p. 101465, XP055852934.

* cited by examiner

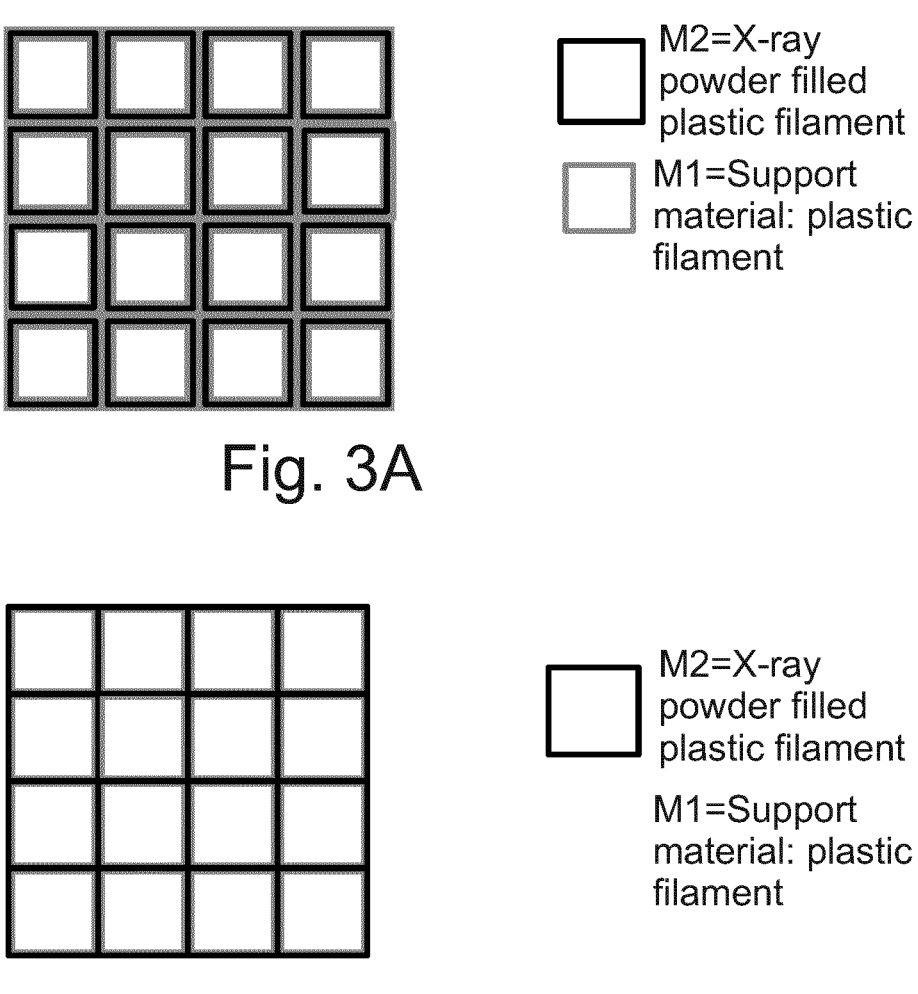
M2=X-ray
powder filled
plastic filament
M1=Support
material: plastic
filament
Fig. 3A
M2=X-ray
powder filled
plastic filament
M1=Support
material: plastic
filament
Fig. 3B
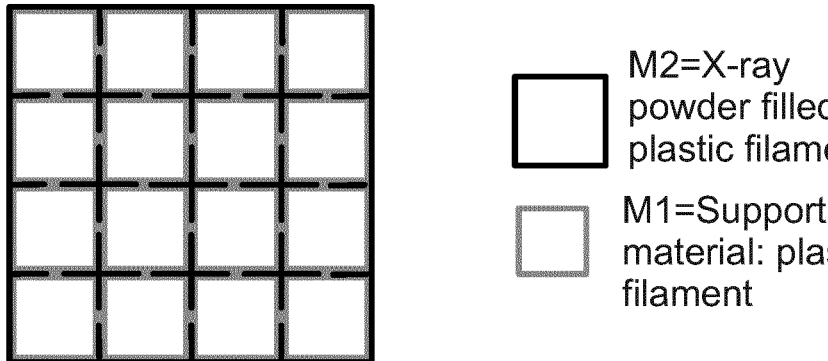
M2=X-ray
powder filled
plastic filament
M1=Support
material: plastic
filament
Fig. 3C M2=X-ray powder filled plastic filament M1=Support material: plastic filament M2=X-ray powder filled plastic filament M1=Support material: plastic filament Basic:

M1 = low X-ray absorbance

M2 = high X-ray absorbance

Stacked walls:

M1 = low X-ray absorbance

M2 = high X-ray absorbance

M3 = high X-ray absorbance

Alternating walls:

M1 = low X-ray absorbance

M2 = high X-ray absorbance

M3 = high X-ray absorbance

A   two side wall support material structures layer 1

B   two side wall support material structures layer 2

C   one X-ray powder filled material layer 1

D   two side wall support material structures layer 3 one X-ray powder filled material layer 2

E   final side wall support material structures layer x one X-ray powder filled material layer x

THREE-DIMENSIONAL PRINTED STRUCTURE WITH DOUBLE WALL ELEMENTS

FIELD OF THE INVENTION

The present invention relates to three-dimensional printing. The invention further relates to a method for three-dimensional printing of a component, a component obtainable by a method, an additive manufacturing apparatus, and a computer program product.

BACKGROUND OF THE INVENTION

In recent years, the use of three-dimensional (3D) printers, which can form a three-dimensional product to have the same shape as an object by using 3D data about the object, is increasing. 3D printing technologies have also been used for manufacturing components in an x-ray system. For example, for the production of large area anti-scatter-grids (ASGs), so far only the one-dimensional (1D) stacking technology is known. Two-dimensional (2D) ASGs are known for computed tomography (CT) e.g. with the 3D printing technology of direct metal laser sintering (DMLS). The x-ray absorbing metal powder is built into 3D structures by laser melting. For flat panel large area ASGs, it may be attractive to have also 2D structures. However, the wall thickness has to be smaller and the pixel pitch has to be smaller. This would lead to a shorter distance between the walls compared to the CT application.

SUMMARY OF THE INVENTION

There may be a need to improve 3D printing of a high-aspect-ratio three-dimensional structures.

The object of the present invention is solved by the subject-matter of the independent claims, wherein further embodiments are incorporated in the dependent claims. It should be noted that the following described aspects of the invention apply also for the method for three-dimensional printing of a component, the component, the additive manufacturing apparatus, and the computer program product.

According to a first aspect of the present invention, there is provided a method for three-dimensional printing of a grid for selective transmission of electromagnetic radiation, particularly x-ray radiation, comprising the steps of:

a) depositing a layer of a plastic material on a substrate to form a first supporting wall element;

b) depositing, parallel to the first supporting wall element, a layer of the plastic material on the substrate to form a second supporting wall element, wherein the second supporting wall element is distanced from the first supporting wall element to form a confined region therebetween;

c) depositing a layer of a metal-containing material in the confined region to form a centre wall element, wherein the first supporting wall element, the second supporting wall element, and the center wall element form a sandwich wall, wherein the metal-containing material comprises a mixture of metal powder in a plastic material or a mixture of metal powder in a binder material, and wherein the metal-containing material is a radiation opaque material; and d) repeating steps a) to c) a selected number of times to produce a selected number of successive layers according to a predefined pattern to print the component, wherein the predefined pattern is a grid-like pattern.

Stated differently, one or more techniques for manufacturing a three-dimensional metal structure are provided. The proposed printing method builds a sandwich wall comprising a center part made out of a metal-containing material sandwiched by the first and second supporting wall elements made out of a plastic material.

In some examples, one, two, three, or more first supporting wall elements may be provided. In some examples, one, two, three, or more second supporting wall elements may be provided. It will be appreciated that the number of the first and second supporting wall elements is dependent upon specified characteristics of the grid that is being constructed.

The metal-containing material may also be referred to as functional material. The metal-containing material may be a mixture of metal powder in a plastic material or a mixture of metal powder in a binder material. The type and/or particle size of the metal powder may depend upon specified characteristics of the grid that is being constructed. The metal-containing material comprises a radiation-opaque material for constructing components, like x-ray filter, grid with x-ray shielding functionality, x-ray collimator, anti-scatter device, and/or x-ray grating. The center wall element may have a wall thickness of between about 5 microns to about 250 microns.

The radiation opaque material is also referred to as not-transparent material or radiation absorbing material. As grids are used for various radiation energies, it depends on the application and on the structure size (e.g., the thickness of the radiation absorbing walls) whether the metal-containing material can be considered as radiation opaque or essentially radiation opaque. In mammography applications, x-ray energies of about 20 keV are used. For these energies, copper may be considered as essentially radiation opaque, which means that grid walls fulfilling the requirements of certain geometry parameters, like wall thickness (e.g. 20 μm), channel height (e.g. 2 mm) etc. lead to absorption of the kind of radiation that is to be selectively absorbed, so that a noticeable improvement of a quality parameter of the radiation detection occurs. A quality parameter may be the scatter radiation-to-primary radiation ratio (SPR), the signal-to-noise ratio (SNR), or the like. For CT applications in the range of e.g. 120 keV, molybdenum (Mo) or other refractory materials (e.g. tungsten) can be considered as essentially radiation opaque, but other materials like copper- or titanium may be likewise essentially radiation opaque if the structure is made in the appropriate thickness. The metal-containing material is to be considered radiation opaque provided that the powder content is sufficiently high. Consequently, the material-containing material is to be considered as radiation opaque if the resulting grid has satisfying selective radiation transmission properties. Clearly, pure plastic materials are to be considered as radiation transparent for all ranges of medically relevant x-ray energies, as an improvement of a quality parameter of the radiation detection with pure plastic materials would only hardly be noticeable. The plastic material may also be referred to as structural material, which is selected for their load-bearing capacity. Each supporting wall element may have a wall thickness of between about 5 microns to about 250 microns. The plastic support material may be used to enable the build-up of a high-aspect-ratio three-dimensional (3D) structure, which is attractive to components for different applications. For example, for the production of large area ASGs, the proposed method would be attractive to manufacture ASGs having a two-dimensional structure with a smaller wall thickness and a smaller pixel pitch The substrate may be a flat thin carbon or polymer substrate. In some examples, the substrate may have low X-ray absorbance and can act as cover of a 1D or two-2D x-ray anti-scatter grid.

The proposed printing strategy may be applicable to a cost-effective 3D printing technology. For example, fused deposition molding (FDM) may be used to realize the proposed printing strategies. FDM melts filaments in a heated nozzle and the material is deposited through a small diameter hole in a continuous flow layer by layer on top of each other. With the proposed printing strategy, the FDM can use e.g. metal powder filled plastic filaments to create the center wall element and use plastic support material to create the first and second supporting wall elements. The proposed printing strategy may be applicable to any suitable polymer-based 3D printing technologies including, but not limited to, powder-based selective laser sintering (SLS) process, multi jet fusion printing process, single nozzle deposition process, and multi-nozzle deposition process.

According to an embodiment of the present invention, step c) starts when the first and second supporting wall elements have at least two layers of the plastic material.

Stated differently, the sequence of applying the plastic layers starts with the supporting wall elements printed with one layer extra height before the center layer with metal-containing material is printed between the supporting wall elements to fill the trench.

According to an embodiment of the present invention, the metal-containing material comprises a mixture of metal powder in a plastic material or a mixture of metal powder in a binder material.

According to an embodiment of the present invention, the center wall element has a wall thickness of between about 5 microns to about 250 microns.

According to an embodiment of the present invention, the sandwich wall has a wall thickness of between about 5 microns to about 400 microns.

In an example, the grid-like pattern is a one-dimensional grid constructed of a series of parallel stripes of sandwich walls.

In another example, the grid-like pattern is a two-dimensional grid constructed of an array of closed lines (e.g. rectangular, square, or hexagonal) having sandwich walls.

According to an embodiment of the present invention, the predefined pattern further comprises a top and/or bottom cover.

The top and/or bottom cover may be a carbon or polymer substrate, which may act simultaneously as e.g. grid packaging.

In some examples, the metal-containing material may comprise an x-ray absorbing material, also referred to x-ray radiation opaque material.

The x-ray absorbing materials that are interesting for x-ray imaging are materials with high z-numbers. The attractiveness is higher if the absorption through a thin material layer (e.g., anti scatter grid wall) is significantly higher compared to the imaged objects and allows a strong beam absorption of an x-ray radiation with a typical energy spectrum used in medical imaging.

Examples of materials with high z-numbers may include one or more of: tungsten, molybdenum, lead, bismuth, silver, gold, tantalum, tin and low-melting temperature solders, e.g. Bi58Sn42, etc.

According to an embodiment of the present invention, at least two metal-containing materials are provided, including a first metal-containing material comprising a first radiation opaque material and a second metal-containing material comprising a second radiation opaque material. The first radiation opaque material and the second radiation opaque material have different radiation absorption properties.

The choice of the first radiation opaque material and the second radiation opaque material may enable optimization of e.g. grid anti-scatter performance.

According to an embodiment of the present invention, the sandwich wall is constructed of a series of alternating layers of the first radiation opaque material and the second radiation opaque material.

According to an embodiment of the present invention, the grid has a grid-like structure constructed of a one-dimensional or two-dimensional alternating sandwich walls of the first x-ray absorbing material and the second x-ray absorbing material.

According to an embodiment of the present invention, the grid comprises one or more of an x-ray filter, a component with x-ray shielding functionality, an x-ray collimator, an anti-scatter device, and an x-ray grating.

According to an embodiment of the present invention, at least one of the following techniques is used for three-dimensional printing of the component: FDM process, powder-based SLS process, multi jet fusion printing process, single nozzle deposition process, or multi-nozzle deposition process.

According to a second aspect of the present invention, there is provided a grid for selective transmission of electromagnetic radiation, particularly x-ray radiation, obtainable by a method according to the first aspect and any associated example.

In an example, the grid is a component in a medical system.

In another example, the grid is a component in a non-medical system, e.g. in food inspection, wheels and tire inspection, industrial CT, electronics inspection.

According to a third aspect of the present invention, there is provided a medical imaging device comprising the grid of the second aspect and any associated example.

Examples of medical imaging devices that benefit from a grid may include, but are not limited to, e.g. x-ray devices (e.g., mammography devices), CT scanners, SPECT devices, and PET scanners.

According to a fourth aspect of the present invention, there is provided an additive manufacturing apparatus comprising a material depositing system for depositing a material at a target area, an energy source for melting the material, and a controller configured to control the material depositing system and the energy source for carrying out the method according to the first aspect and any associated example.

For example, in the case of a FDM process, the energy source is a heating member. For example, in the case of an SLS process, the energy source may be a laser or other directed energy sources.

According to an embodiment of the present invention, the additive manufacturing apparatus comprises one or more of:

an additive manufacturing apparatus configured to perform a fused deposition molding (FDM) process;

an additive manufacturing apparatus configured to perform a powder-based selective laser sintering (SLS) process;

an additive manufacturing apparatus configured to perform a multi jet fusion printing process;

an additive manufacturing apparatus configured to perform a single nozzle deposition process; or an additive manufacturing apparatus configured to perform a multi-nozzle deposition process.

For example, an additive manufacturing apparatus configured to perform an FDM process, also referred to as FDM 3D printer, may comprise one or more nozzles to which a filament in a solid or powdered form may be continuously supplied by rotation of a roll. The FDM 3D printer may comprise a heating member for heating the filament. The FDM 3D printer may further comprise a transport device on which the one or more nozzles may be mounted, which is positioned-controlled in a three directions of XYZ. The FDM 3D printer may comprise a controller configured to control the three-dimensional transport device to move along a path calculated in real time by a three-dimensional program, and to control the heating member and nozzle to melt and inject material to form the supporting wall element. The additive manufacturing apparatus may be a polymer-based 3D printer, which involves layer-by-layer construction or additive fabrication (as opposed to material removal as with conventional machining processes). Suitable polymer-based 3D printing technologies may include, but are not limited to, powder-based SLS process, multi jet fusion printing process, single nozzle deposition process, and multi-nozzle deposition process.

For example, an additive manufacturing apparatus configured to perform a powder-based SLS process, also referred to as SLS 3D printer, may comprise a beam means for selectively emitting a directed energy beam. The beam means may include a laser or other directed energy sources. A laser control mechanism operates to move the laser beam and modulates the laser to selectively sinter a layer of powder dispensed into the target area. The controller may operate to selectively sinter only the power disposed within defined boundaries to produce the desired layer. According to a further aspect of the present invention, there is provided a computer program comprising instructions to cause the additive manufacturing apparatus according to the third aspect to execute the steps of the method according to the first aspect and any associated example.

According to a still further aspect of the present invention, there is provided a computer-readable medium having stored thereon the computer program.

These and other aspects of the present invention will become apparent from and be elucidated with reference to the embodiments described hereinafter.

BRIEF DESCRIPTION OF THE DRAWINGS

These and other aspects of the invention will be apparent from and elucidated further with reference to the embodiments described by way of examples in the following description and with reference to the accompanying drawings, in which

FIGS. 3A-3E show examples of a structure of a component.

Figure 1:
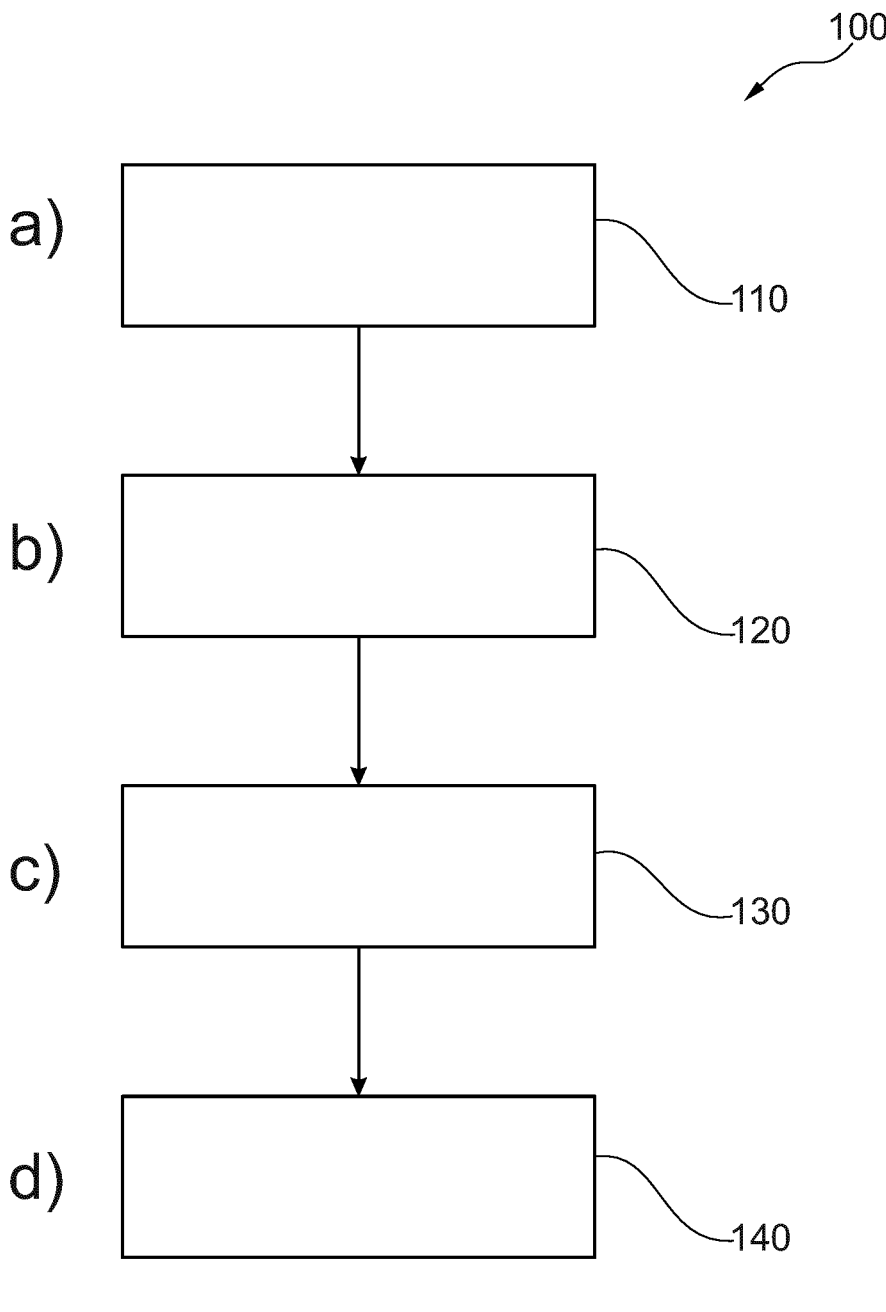
FIG. 1 shows a flow chart of an exemplary method for three-dimensional printing of a component.

It should be noted that the figures are purely diagrammatic and not drawn to scale. In the figures, elements which correspond to elements already described may have the same reference numerals. Examples, embodiments or optional features, whether indicated as non-limiting or not, are not to be understood as limiting the invention as claimed.

DETAILED DESCRIPTION OF EMBODIMENTS

Grids for selective transmission of electromagnetic radiation are particularly known from medical imaging devices such as Computed Tomography (CT) scanners and Single Photon Emission Computed Tomography (SPECT) devices or Positron Emission Tomography (PET) scanners. Other devices, e.g. non-destructive x-ray testing devices, may also use said grids. Such a grid is positioned between a radiation source (in a CT scanner this is an x-ray source, in SPECT/PET a radioactive isotope injected into a patient forms the radiation source) and a radiation-sensitive detection device and is used to selectively reduce the content of a certain kind of radiation that must not impinge on the radiation detection device, the reduction usually being realized by means of absorption. In a CT scanner for example, the grid is used to reduce the amount of scattered radiation that is generated in an illuminated object, as the medical image quality deteriorates if scattered radiation is measured, as is known in the art. As today CT scanners often apply cone beam geometry, hence illuminate a large volume of an object, the amount of scattered radiation is often superior to the amount of the medical information carrying non-scattered primary radiation (e.g. scattered radiation can easily amount to up to 90% or more of the overall radiation intensity). Hence, there is a large demand for grids that efficiently reduce scattered radiation. Grids that do fulfill this demand are grids that have radiation absorbing structures in two dimensions, so-called two-dimensional anti-scatter grids (2D ASG). However, the wall thickness of the ASG has to be smaller and the pixel pitch has to be smaller. This would lead to a shorter distance between the walls compared to the CT application.

Towards this end, FIG. 1 shows a flow chart of a method 100 for three-dimensional printing of a grid for selective transmission of electromagnetic radiation, particularly x-ray radiation. The following steps have been described with reference to exemplary layers shown in FIG. 2.

Generally, the component may be built based on a three-dimensional model generated by a computer-aided design (CAD) software or acquired by a digital scanner. The three-dimensional model may be decomposed into one or more slices. The number of slices may be a function of the capabilities of the 3D printer and/or the height dimension of the three-dimensional structure of the component. For example, an FDM 3D printer may be configured to developed a layer having a thickness in the range of about 5 microns to about 100 microns. The model may then be decomposed into the specified number of slices accordingly. For example, in the case of a one-dimensional and/or two-dimensional anti-scatter grid, the height of the anti-scatter grid is generally in the range of about 5 millimeters to about 50 millimeters. Thus, a model representing the anti-scatter grid would be decomposed into about 50 to about 10000 slices. It will be appreciated that respective slices represent a printing pattern. In other words, by decomposing the three-dimensional model into slices, printing patterns are generated, where respective patterns correspond to a slice of the model. Once the printing patterns have been generated, the component can be printed by a 3D printer from a file. e.g. a stereolithography file format (STL) file, which stores the three-dimensional model of the component.

The additive manufacturing apparatus comprises a material depositing system for depositing a material at a target area, an energy source for melting the material, and a controller configured to control the material depositing system and the energy source for carrying out the method according to the first aspect and any associated example. For purposes of illustration only. FDM is described below for production of a component. FDM belongs to the material injection method, which is a method of applying a high temperature heat to a filament in a solid or powdered form and injecting it in a molten state through a nozzle. In this way, the material is deposited through a small diameter hole in a continuous flow layer by layer on top of each other. However, it will be appreciated that the method described above and below may be adapted to any suitable polymer-based 3D printing technologies, which involve layer-by-layer construction or additive fabrication (as opposed to material removal as with conventional machining processes). For example, further suitable 3D printing methods may include, but are not limited to, powder-based SLS process, multi jet fusion printing process, single nozzle deposition process, and multi-nozzle deposition process. Accordingly, the following described examples are set forth without any loss of generality to, and without imposing limitations upon, the claimed invention.

Figure 2:
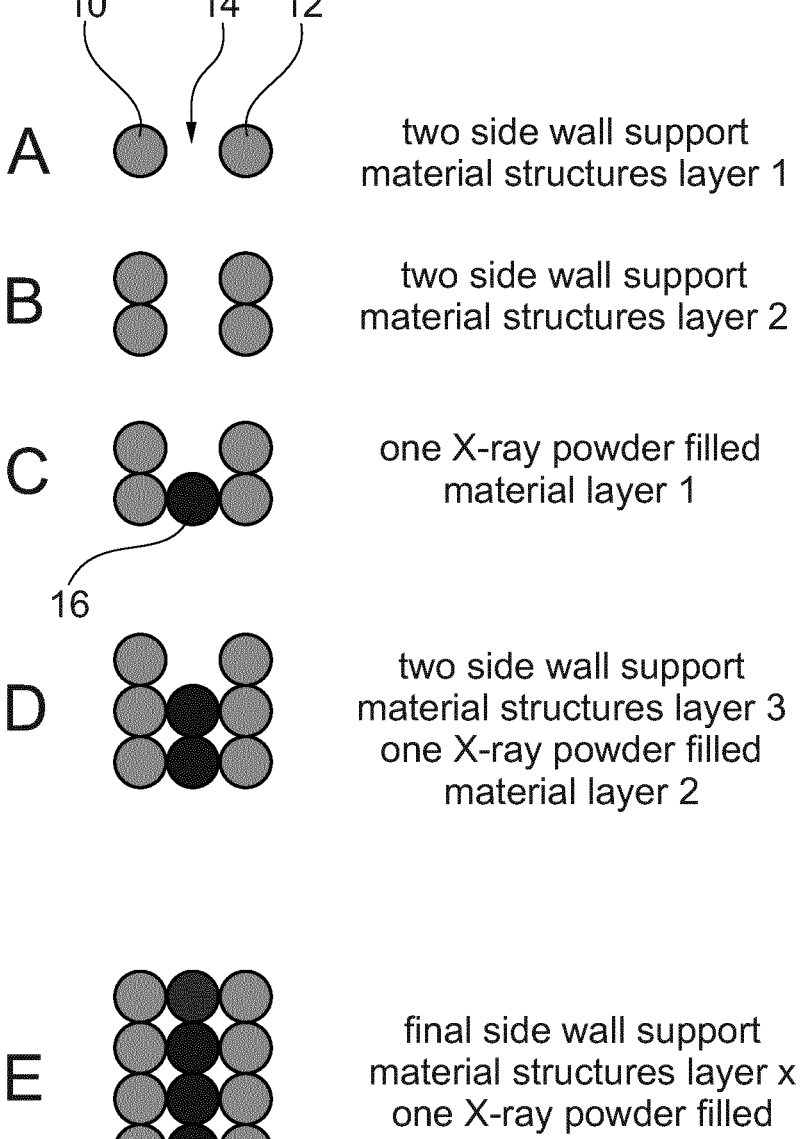
FIG. 2 shows exemplary layers manufactured using a three-dimensional printing technique.

In step 110. i.e. step a), the printing begins by depositing a layer of a plastic material on a substrate to form a first supporting wall element 10. The substrate may be a flat thin carbon or polymer substrate. An example of the first supporting wall element is shown in FIG. 2. In this example, only one first supporting wall element is illustrated. In some examples (not shown), two or more first supporting wall elements may be deposited e.g. to provide additional stability.

Generally, the plastic material may be deposited on the substrate such that a thin layer (e.g. 5 to about 100 microns thick) of the plastic material is formed. The wall thickness of the first supporting wall element 10 may depend upon the specified characteristics of the component that is being constructed. For example, the wall thickness of the first supporting wall element 10 may have a wall thickness of about 5 microns to about 250 microns. The plastic material may be selected for their load-bearing capacity. Various polymers may be used as the plastic material, including, but are not limited to, acrylonitrile butadiene styrene (ABS), polycarbonate (PC), polylactic acid (PLA), high-density polyethylene (HDPE), PC/ABS, polyethylene terephthalate (PETG), polyphenylsulfone (PPSU) and high impact polystyrene (HIPS).

As described above, the first supporting wall element 10 may be manufactured by an FDM 3D printer. To this end, a filament in a solid or powdered form may be continuously supplied to a nozzle of the FDM 3D printer by the rotation of a roll. In order to inject the filament, a heating member may be disposed inside the nozzle. The nozzle may be mounted on a three-dimensional transport device, which is position-controlled in three directions of XYZ. The three-dimensional transport device may be free to move along a path calculated in real time by a three-dimensional program. The melted and injected material may be then laminated on the substrate to form the first supporting wall element.

In step 120, i.e. step b), parallel to the first supporting wall element 10, a layer of the plastic material is deposited to form a second supporting wall element 12. An example of the second supporting wall element 12 is shown in FIG. 2. In this example, only one second supporting wall element 12 is illustrated. In some examples (not shown), two or more second supporting wall elements may be deposited.

The second supporting wall element 12 is distanced from the first supporting wall element 10 to form a confined region 14 therebetween, thereby leaving a vacancy for a metal-containing material. Depending upon the component that is being constructed, the second supporting wall element 12 may be distanced from the first supporting wall element 10 by e.g. about 5 microns to about 250 microns.

The second supporting wall element 12 may be also manufactured by the FDM 3D printer. The melted and injected plastic material may be laminated on the substrate to form the second supporting wall element that is distance from the first supporting wall element.

In some examples, the second supporting wall element 12 may be deposited after the first supporting wall element 10. For example, the second supporting wall element 12 and the first supporting wall element 10 may be injected through the same nozzle, but in a sequential manner.

In some other examples, the second supporting wall element 12 and the first supporting wall element 10 may be deposited simultaneously. For example, the second supporting wall element 12 and the first supporting wall element 10 may be injected simultaneously through two different nozzles.

In step 130, i.e. step c), a layer of a metal-containing material is deposited in the confined region to form a center wall element 16. The first supporting wall element, the second supporting wall element, and the center wall element form a sandwich wall 18.

In some examples, the metal-containing material may be a mixture of metal powder in a plastic material. The plastic material used for the metal-containing material and the plastic material used for the first and second supporting wall elements may be of the same plastic material, but in addition with metal particles. Once the plastic material of the metal-containing material is melted, filled as a kind of "liquid" filament into the confined region, the metal-containing material will combine with the plastic material of the first and second supporting wall elements to form a stable "3-element-wall" when cooling down.

In some examples, the metal-containing material may be a mixture of metal powder in a binder material. The binder material may be used to cause the metal particles to adhere to one another and may be comprised of resins, epoxies and/or other materials having characteristics that are known those skilled in the art for binding powders. In this way, metal particles that are in close spatial proximity to where the binder is applied are glued, or otherwise adhered/bonded, together.

The type and/or particle size of the metal powder may depend upon specified characteristics of the component that is being constructed. For example, the metal-containing material may comprise a radiation opaque material for constructing components. As grids are used for various radiation energies, it depends on the application which radiation opaque material will be used. In the following, for illustration purposes only, the radiation opaque material is provided as x-ray radiation opaque material for x-ray devices (e.g., mammography devices). However, it will be appreciated that the above- and below-described radiation opaque material may be a radiation opaque material for selective transmission of other electromagnetic radiation for e.g., SPECT devices, or PET scanners.

Taking x-ray radiation opaque materials as an example, the grid may be an x-ray grid for selective transmission of x-ray radiation. The x-ray radiation opaque material is also referred to as x-ray absorbing material in the present disclosure. Examples of the grid may include, but are not limited to, an x-ray filter, a component with x-ray shielding functionality, an x-ray collimator, an anti-scatter device, and/or an x-ray grating. Powder for the x-ray absorbing material may include, but are not limited to, tungsten, molybdenum, lead, tantalum, tin, low-melting temperature solders, e.g. Bi58Sn42, and/or other high-density metal. In such applications, a preferred particle size of the powdered metal may be in the range of about 5 microns to 50 microns in diameter, for example.

The mixing ratio of the metal powder and the binder material or the plastic material may be selected to achieve a particular function. For example, the metal powder may be embedded in the plastic material or the binder material up to a certain level of volume percentage to achieve a high x-ray absorption.

In some examples, the metal-containing material and the plastic material may be deposited in a simultaneous manner. For example, the center wall element 16, the second supporting wall element 12, first supporting wall element 10 may be injected simultaneously through three different nozzles.

In some other examples, the metal-containing material and the plastic material may be deposited in a sequential manner. For example, as shown in FIG. 2, two layers of two supporting wall elements is firstly deposited (steps A and B), which leaves a vacancy for the metal-containing material. Then, one layer of the metal-containing material is deposited into the vacancy to form the center wall element (step C). As will be described below, the above-described steps may be repeated until a desired height of the wall structure is reached and the last layer of the metal-containing material is deposited into the vacancy (steps D and E).

For the FDM process, the parameters for the temperatures for the plastic material and the metal-containing material may be adapted in a way that after deposition both materials melt into each other to build a strong wall structure. Due to the different heat capacity, the filament speed and the filament temperature at different nozzles may be different. Additionally, different nozzles of a multi-nozzle FDM 3D printer (e.g. dual-nozzle 3D printer or three-nozzle 3D printer) may be positioned precisely by the FDM 3D printer to meet the tolerances of the component that is being constructed.

In step 140, i.e. step d), step a) to c) may be repeated a selected number of times to produce a selected number of successive layers according to a predefined pattern to print the component.

It will be appreciated that the above operation may be performed in any suitable order, e.g., consecutively, simultaneously, or a combination thereof, subject to, where applicable, a particular order being necessitated. Thus, it is possible to interchange some of the processing steps.

In some examples, it is also possible to exchange steps a) and b). The process will be as follows: b)→a)→c)→d).

In some examples, it is possible to perform steps a) and b) in a simultaneous manner. The process will be as follows: a), b)→c)→d).

In some examples, it is possible to perform steps a), b), and c) simultaneously. The process will be as follows: a), b), c)→d).

The component manufactured with 3D printing technologies may require some degree of post-production treatment. For example, a post-processing process may be performed to optimize the surface roughness of e.g. ASGs for less disturbing effect in the image acquisition or calibration.

Generally, the above-described method may be used to produce a component having any desired pattern. One example is a grid-like pattern. The grid-like pattern may be a one-dimensional grid constructed of a series of parallel stripes of sandwich walls. The grid-like pattern may be a two-dimensional structure constructed of an array of closed structures (e.g. rectangular structures, square structures, etc.) having sandwich walls.

FIGS. 3A-3E show examples of a component produced by the method described above. For purposes of illustration only, the component has a two-dimensional grid-like structure. As described above, the plastic support material is beneficial to enable the build-up of a high-aspect-ratio three-dimensional (3D) structure, such as two-dimensional grid-like structures.

The component shown in FIG. 3A is constructed of an array of closed structures having sandwich walls. Each sandwich wall between adjacent closed structures is constructed by two center wall elements of a metal-containing material, indicated with M2, and three supporting wall elements of a plastic material, indicated with M1. This may allow for good stability.

The component shown in FIG. 3B is also constructed of an array of closed structures having sandwich walls. Each sandwich wall between adjacent closed structures is constructed by one center wall element of a metal-containing material, indicated with M2, and two supporting wall elements of a plastic material, indicated with M1. The component shown in FIG. 3B has a continuous grid of the metal-containing material.

The component shown in FIG. 3C is also constructed of an array of closed structures having sandwich walls. Each sandwich wall between adjacent closed structures is constructed by one center wall element of a metal-containing material, indicated with M2, and two supporting wall elements of a plastic material, indicated with M1. Different from the component shown in FIG. 3B, the component shown in FIG. 3C has an interrupted grid of the metal-containing material.

Figure 3D:
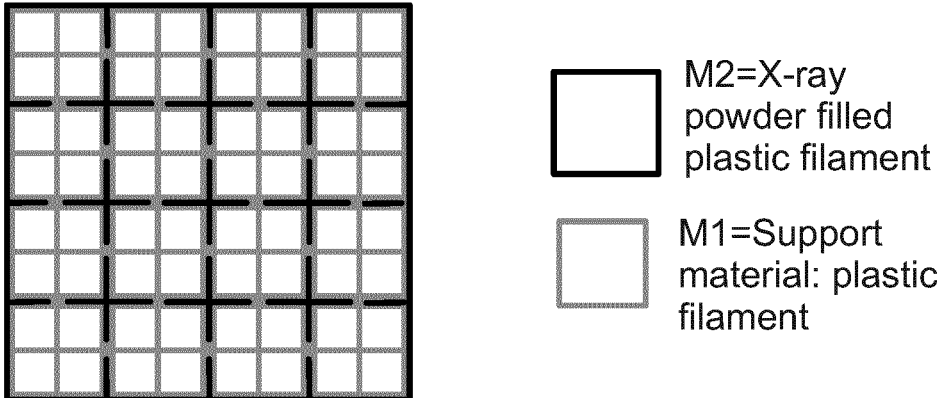

The component shown in FIG. 3D is also constructed of an array of closed structures having sandwich walls. Each sandwich wall between adjacent closed structures is constructed by one center wall element of a metal-containing material, indicated with M2, and two supporting wall elements of a plastic material, indicated with M1. Different from the component shown in FIG. 3C, the component shown in FIG. 3D has an additional two-dimensional grid creating bridges to provide additional stability. The bridges may be vertical, horizontal but also diagonal or like a diagonal cross (X).

Figure 3E:
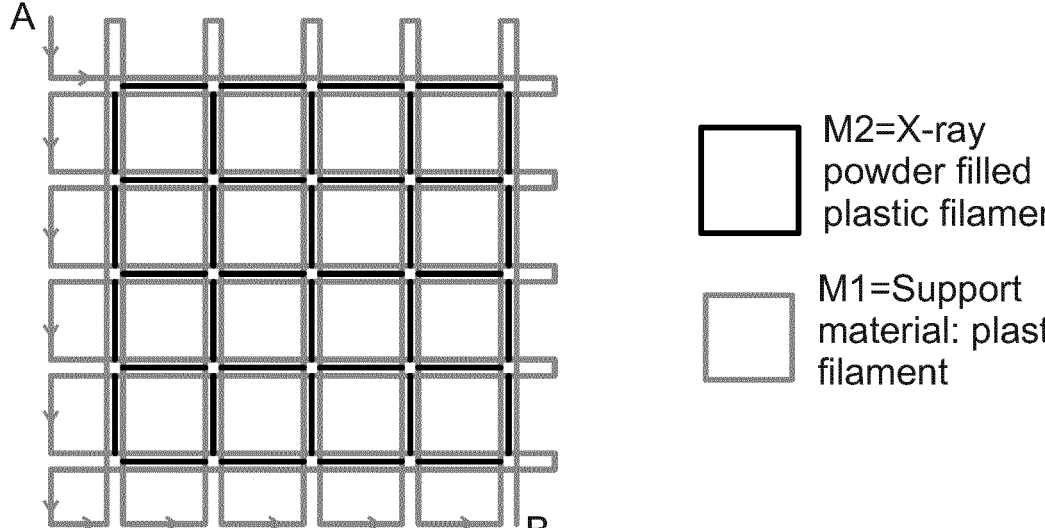

The component shown in FIG. 3E is also constructed of an array of closed structures having sandwich walls. Each sandwich wall between adjacent closed structures is constructed by one center wall element of a metal-containing material, indicated with M2, and two supporting wall elements of a plastic material, indicated with M1. The pattern shown in FIG. 3E allows continuous FDM writing of M1 from point A to point B, thereby avoiding the accumulation of the plastic material on particular positions.

In the examples shown in FIGS. 3A-3E, the metal-containing material is shown as an x-ray powder filled plastic filament. It will be appreciated that the characteristics, or type, of the metal-containing material that is applied may be a function of the intended application for the three-dimensional component.

Figure 4A:
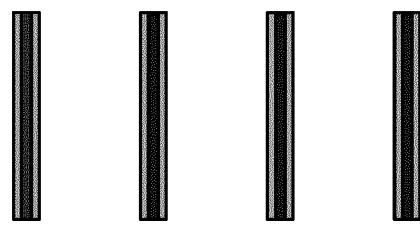
FIGS. 4A-4C show exemplary wall structures of a component.
Figure 4B:
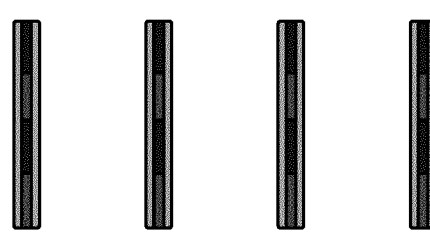
Figure 4C:
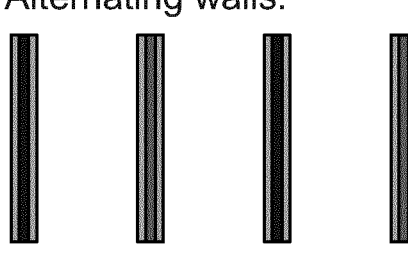

FIGS. 4A-4C shows three wall structuring options.

In the example of FIG. 4A, only one metal-containing material is provided.

In some examples, at least two metal-containing materials are provided, e.g. including a first metal-containing material comprising a first x-ray absorbing material and a second metal-containing material comprising a second x-ray absorbing material. The first x-ray absorbing material and the second x-ray absorbing material may have different radiation absorption properties. For example, the first x-ray absorbing material is mainly used for the function to absorb x-ray while the second x-ray absorbing material is used to build the structure with a 3D printing technology. For example, the first x-ray absorbing material may be comprised tungsten metal, whilst the second x-ray material may be comprised powdered molybdenum metal. For example, as shown in FIG. 4B, each sandwich wall may be constructed of a series of alternating layers of the first x-ray absorbing material, indicated with M2, and the second x-ray absorbing material, indicated with M3. A further example is shown in FIG. 4C, which has a grid-like structure constructed of a one-dimensional or two-dimensional alternating sandwich walls of the first x-ray absorbing material, indicated with M2, and the second x-ray absorbing material, indicated with M3. The choice of the first x-ray absorbing material and the second x-ray absorbing material may enable optimization of e.g. grid anti-scatter performance.

Optionally, the components shown in FIGS. 3A-3E may have a top layer and/or a bottom layer (not shown) to form a closed structure. The top and/or bottom layer may be a carbon or polymer substrate, acting simultaneously as grid packaging.

Optionally, one or more fixtures may be printed to connect and align to an external device. For example, for the production of large area ASGs, fixtures may be printed to connected and align to an x-ray detector.

In some examples, the components shown in FIGS. 3A-3E may be ASGs. Each sandwich wall represents an anti-scatter plate, which is also referred to as septa. Generally, the exemplary ASGs shown in FIGS. 3A-3E may have a height of about 5 millimeters to 50 millimeters and are configured to absorb, attenuate, or otherwise alter radiation so that it is not detected by channels of the x-ray detector array. The metal-containing material for the exemplary ASGs may be composed of molybdenum, tungsten, and/or other material that has characteristics that make it able to absorb or otherwise alter radiation striking the anti-scatter septa.

The components shown in FIGS. 3A-3E may be applied to a non-focused or focused grid. In a non-focused grid, the septa walls are mounted parallel to each other which means that the grid is "focused" at infinite distance. Such a grid may be used together with small fields or at very large focal distances.

Figure 5:
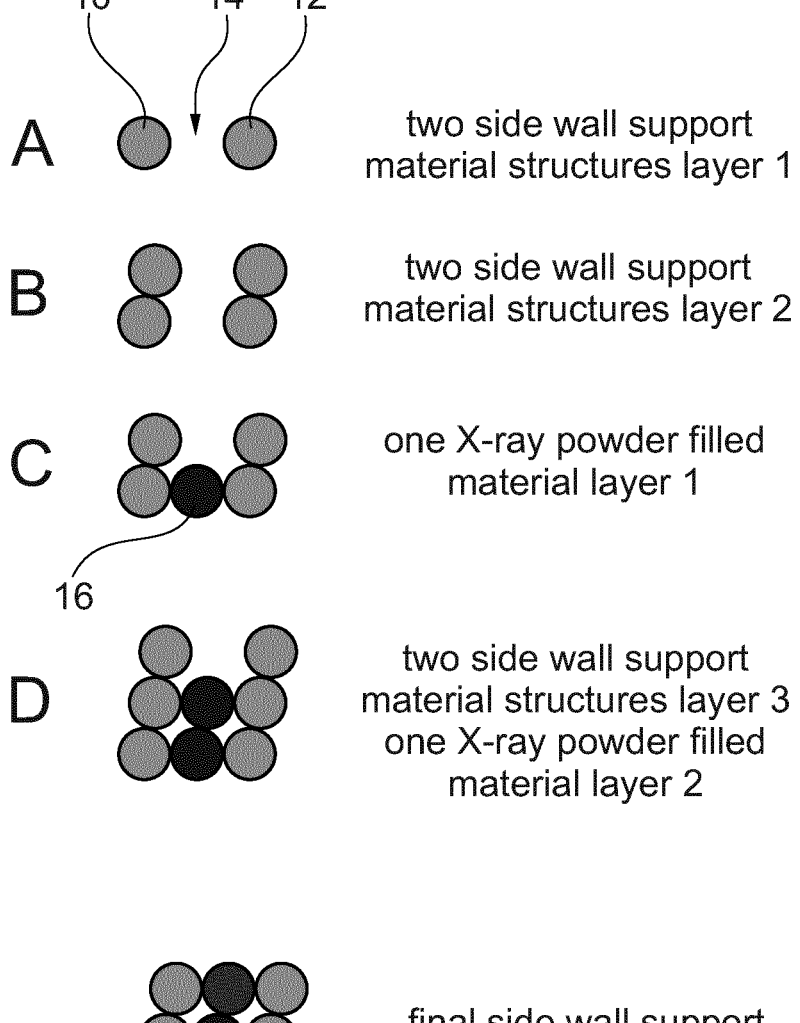
FIG. 5 shows another exemplary layers manufactured using a three-dimensional printing technique.

It will be appreciated that, with the proposed 3D printing strategy, it is also possible to change the wall positions layer by layer to manufacture components having a focused grid. In the focused grid, the septa walls are angled and focused at a specific distance which means that the grid can only be used at a specific focal distance. The angled septa walls may be printed by changing wall positions layer by layers. For example, FIG. 5 shows another exemplary layers manufactured using a three-dimensional printing technique. Unlike the example shown in FIG. 2, the sandwich wall is angled by changing wall positions layer by layer. The focused grid may be used only at a specified focal distance.

The grids may be one-dimensional or two-dimensional grids. The above-proposed printing strategy may also be used to print a two-dimensional grid constructed of an array of closed lines (e.g. rectangular, square, or hexagonal) having sandwich walls. In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an"

does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for three-dimensional printing of a grid for selective transmission of electromagnetic radiation, comprising:

a) depositing a layer of a plastic material on a substrate to form a first supporting wall element;

b) depositing, parallel to the first supporting wall element, a layer of the plastic material on the substrate to form a second supporting wall element, wherein the second supporting wall element is distanced from the first supporting wall element to form a confined region therebetween;

c) depositing a layer of a metal-containing material in the confined region to form a center wall element, wherein the first supporting wall element, the second supporting wall element, and the center wall element form a sandwich wall, wherein the metal-containing material comprises a mixture of metal powder in a plastic material or a mixture of metal powder in a binder material, and wherein metal-containing material is a radiation opaque material; and repeating a) to c) a selected number of times to produce a selected number of successive layers according to a predefined pattern to print the component, wherein the predefined pattern is a grid-like pattern.

2. The method according to claim 1, wherein c) starts when the first and second supporting wall elements have at least two layers of the plastic material.

3. The method according to claim 1, wherein the center wall element has a wall thickness of between about 5 microns to about 250 microns.

4. The method according to claim 1, wherein the sandwich wall has a wall thickness of between about 5 microns to about 400 microns.

5. The method according to claim 1, wherein the predefined pattern further comprises a top cover and/or a bottom cover.

6. The method according to claim 1, wherein at least two metal-containing materials are provided, including a first metal-containing material comprising a first radiation opaque material and a second metal-containing material comprising a second radiation opaque material; and wherein the first radiation opaque material and the second radiation opaque material have different radiation absorption properties.

7. The method according to claim 6, wherein the sandwich wall is constructed of a series of alternating layers of the first radiation opaque material and the second radiation opaque material; and/or wherein the component has a grid-like structure constructed of a one-dimensional or two-dimensional alternating sandwich walls of the first radiation opaque material and the second radiation opaque material.

8. The method according to claim 1, wherein the grid comprises one or more of:

an x-ray filter;

a component with x-ray shielding functionality;

an x-ray collimator;

an anti-scatter device; and an x-ray grating.

9. The method according to claim 1, wherein at least one of the following techniques is used for three-dimensional printing of the component:

fused deposition molding, FDM, process;

powder-based selective laser sintering, SLS, process;

multi jet fusion printing process;

single nozzle deposition process; and multi-nozzle deposition process.

10. A grid for selective transmission of electromagnetic radiation obtainable by the method according to claim 1.

11. An additive manufacturing apparatus, comprising:

a material depositing system configured to a material at a target area;

an energy source configured to melting the material; and a controller configured to control the material depositing system and the energy source for carrying out a method comprising:

a) depositing a layer of a plastic material on a substrate to form a first supporting wall element;

b) depositing, parallel to the first supporting wall element, a layer of the plastic material on the substrate to form a second supporting wall element, wherein the second supporting wall element is distanced from the first supporting wall element to form a confined region therebetween;

c) depositing a layer of a metal-containing material in the confined region to form a center wall element, wherein the first supporting wall element, the second supporting wall element, and the center wall element form a sandwich wall, wherein the metal-containing material comprises a mixture of metal powder in a plastic material or a mixture of metal powder in a binder material, and wherein metal-containing material is a radiation opaque material; and repeating a) to c) a selected number of times to produce a selected number of successive layers according to a predefined pattern to print the component, wherein the predefined pattern is a grid-like pattern.

12. The additive manufacturing apparatus according to claim 11, comprising one or more of:

an additive manufacturing apparatus configured to perform a fused deposition molding, FDM, process;

an additive manufacturing apparatus configured to perform a powder-based selective laser sintering, SLS, process;

an additive manufacturing apparatus configured to perform a multi jet fusion printing process;

an additive manufacturing apparatus configured to perform a single nozzle deposition process; and an additive manufacturing apparatus configured to perform a multi-nozzle deposition process.

13. A non-transitory computer-readable medium having stored thereon executable instructions, which cause a method for three-dimensional printing of a grid for selective transmission of electromagnetic radiation to be performed, the method comprising:

a) depositing a layer of a plastic material on a substrate to form a first supporting wall element;

b) depositing, parallel to the first supporting wall element, a layer of the plastic material on the substrate to form a second supporting wall element, wherein the second supporting wall element is distanced from the first supporting wall element to form a confined region therebetween;

c) depositing a layer of a metal-containing material in the confined region to form a center wall element, wherein the first supporting wall element, the second supporting wall element, and the center wall element form a sandwich wall, wherein the metal-containing material comprises a mixture of metal powder in a plastic material or a mixture of metal powder in a binder material, and wherein metal-containing material is a radiation opaque material; and repeating a) to c) a selected number of times to produce a selected number of successive layers according to a predefined pattern to print the component, wherein the predefined pattern is a grid-like pattern.

\* \* \* \* \*